Jan. 26, 1954  L. E. PUCHER  2,667,527
DEFERRED ACTION BATTERY
Filed Aug. 15, 1949  3 Sheets-Sheet 1

INVENTOR.
LEO E. PUCHER
BY Hudson, Boughton,
Williams, David & Hoffmann.
ATTORNEYS

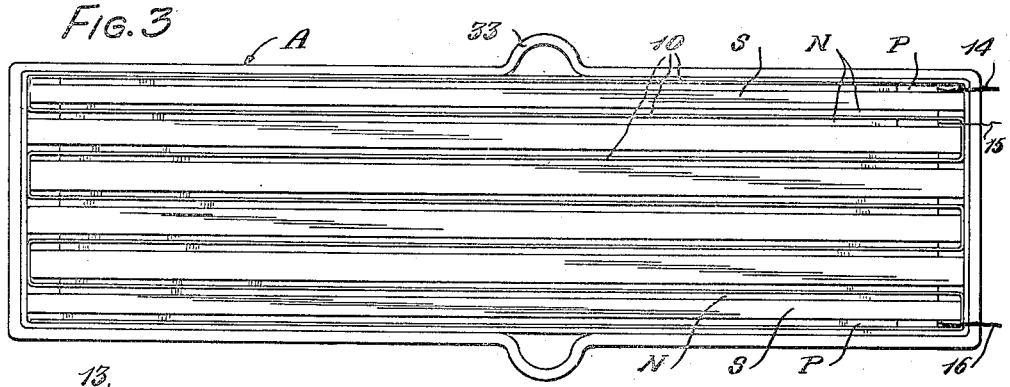
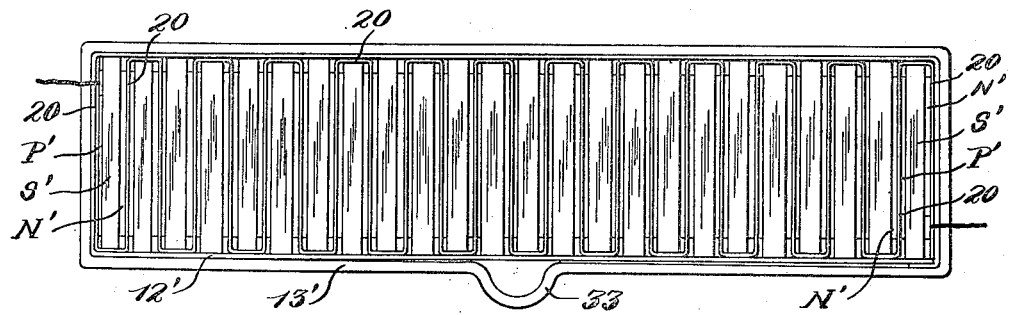

Jan. 26, 1954  L. E. PUCHER  2,667,527
DEFERRED ACTION BATTERY
Filed Aug. 15, 1949  3 Sheets-Sheet 3

INVENTOR.
LEO E. PUCHER
BY Hudson, Boughton,
Williams, David & Hoffmann
ATTORNEYS Patented Jan. 26, 1954

2,667,527

UNITED STATES PATENT OFFICE 2,667,527

DEFERRED ACTION BATTERY

Leo E. Pucher, Euclid, Ohio, assignor to Willard Storage Battery Company, Cleveland, Ohio, a corporation of Ohio Application August 15, 1949, Serial No. 110,287

3 Claims. (Cl. 136—90)

1

The present invention relates to electric batteries and to a method of making the same.

One of the objects of the invention is the provision of a novel and improved method of manufacturing electric batteries by which battery plates are expeditiously assembled into a plurality of series-connected cells.

Another object of the invention is the provision of a novel and improved method of manufacturing batteries by which positive and negative plates are positioned on opposite sides of an electric insulating member impervious to the electrolyte of the battery and riveted thereto and to each other and subsequently assembled with other plates to form cells, the insulating material forming at least a part of the cell dividers.

Another object of the invention is the provision of a novel and improved method of manufacturing electric batteries, which method comprises riveting or stapling a plurality of positive and negative plates to opposite sides of a flexible, electric insulating member impervious to the electrolyte of the battery, folding the flexible member with the plates connected thereto so as to position positive and negative plates adjacent to each other with a porous separator therebetween, and the flexible material forming a part of the cell dividers.

Another object of the invention is the provision of a novel and improved electric battery comprising positive and negative plates located at opposite sides of an electric insulating member impervious to the electrolyte of the battery, the plates being riveted together with the member and the member forming a part of the cell dividers when the plates are assembled into a multi-cell battery.

Another object of the invention is the provision of a novel and improved electric battery having a plurality of positive and negative plates located at opposite sides of a flexible, electric insulating member impervious to the battery electrolyte and stapled or riveted to each other and to the member, the member being folded so as to position positive and negative plates adjacent to each other with the member forming a part of the cell dividers, and porous separators between the positive and negative plates between alternate folds of the member.

Another object of the invention is the provision of a novel and improved, multi-cell electric battery capable of being stored dry and activated by the addition of a liquid thereto, which battery comprises a plurality of open bottomed cells, each having an electrolyte absorbing insulator or separator between the positive and negative plates thereof enclosed within a casing having a liquid inlet, provision for draining excess liquid from the battery, and a space or clearance between the casing and the bottom of the plates and separators for the reception of excess electrolyte.

A further object of the invention is the provision of an electric battery assembly or pack adapted to be stored dry and activated by the mere addition of a liquid thereto, which assembly or pack includes one or more batteries, each comprising a plurality of open bottomed cells, housed within a casing having provision for admitting and draining liquid therefrom, and a clearance between the casing and the lower ends of the battery plates and separators.

The invention resides in certain combinations and arrangements of method steps and parts and further objects and advantages of the invention will be apparent to those skilled in the art to which it relates from the following description of the preferred embodiment described with reference to the accompanying drawings forming a part of this specification, in which Fig. 1 is a perspective view of an electric battery assembly constructed in accordance with the present invention;

Fig. 3 is a plan view of one of the four multicell batteries shown in Fig. 2;

Fig. 4 is a side elevational view of the battery shown in Fig. 3, with parts broken away to show the construction;

Fig. 5 is a plan view of another of the multicell batteries shown in Fig. 2;

As previously stated, the invention contemplates the provision of a new and improved battery and method of making the same. In general, the battery comprises a plurality of electrically connected battery cells, each cell comprising a positive and negative plate having an electrolyte absorbing member therebetween, and adjoining cells fixed to and separated by an insulator impervious and inert to the electrolyte and which insulator forms a part of the cell divider. The battery cells are assembled by first arranging positive and negative battery plates in face-to-face relationship with the insulating member therebetween. The insulating member is preferably flexible and of such size that a number of sets of plates may be assembled in the relation described having the insulating member common to all of the plates. After being assembled with the insulating sheet, the plates are electrically connected to one another and attached to the insulating member by metallic connector means extending through the oppositely disposed plates and insulating member.

Subsequently each plate of one polarity, for example each of the negative plates, has an electrolyte absorbing separator member attached thereto. Preferably, the insulating member is ribbon-like in form and the sets of plates are arranged longitudinally thereof with adjacent plates on any one side of the sheet being of opposite polarity. The sets of plates are so spaced longitudinally of the insulating sheet or ribbon that by folding the latter accordion fashion, the plates extend in substantially parallel, aligned relationship with a pair of positive and negative plates within each fold and forming a cell and spaced from one another by an electrolyte absorbing separator member. The folds of the insulating sheet form the cell dividers or parts thereof. The open sides of the group of cells thus formed are preferably closed by suitable insulating material as by wrapping moisture-proof tape about the sides of the group. The bottoms of the cells may be closed in a similar manner; however, they are preferably left open and the group of cells inserted in a suitable casing with the bottom of the cells spaced from the bottom of the casing. The casing preferably includes means for admitting and draining water or suitable electrolyte therefrom.

Although the invention is applicable to electric batteries of various forms and capacities, it is particularly adapted to small, light-weight, primary batteries capable of being stored dry and activated by the mere addition of water and operable over a wide range of temperatures, for example, batteries such as are used with radio equipment carried by meteorological balloons. The invention is herein illustrated and described as applied to a battery of this character. It is to be understood, however, that the invention is not limited to batteries of this particular type but is applicable to batteries of other forms and capacities.

Figure 1:
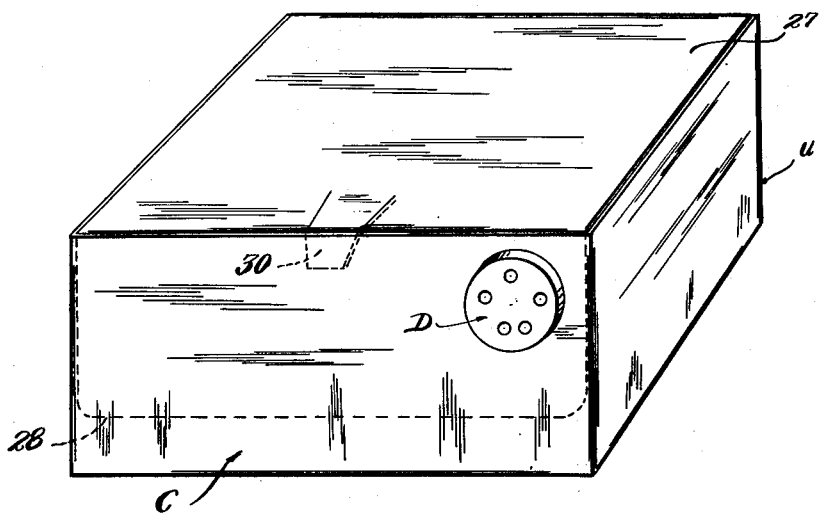
Figure 2:
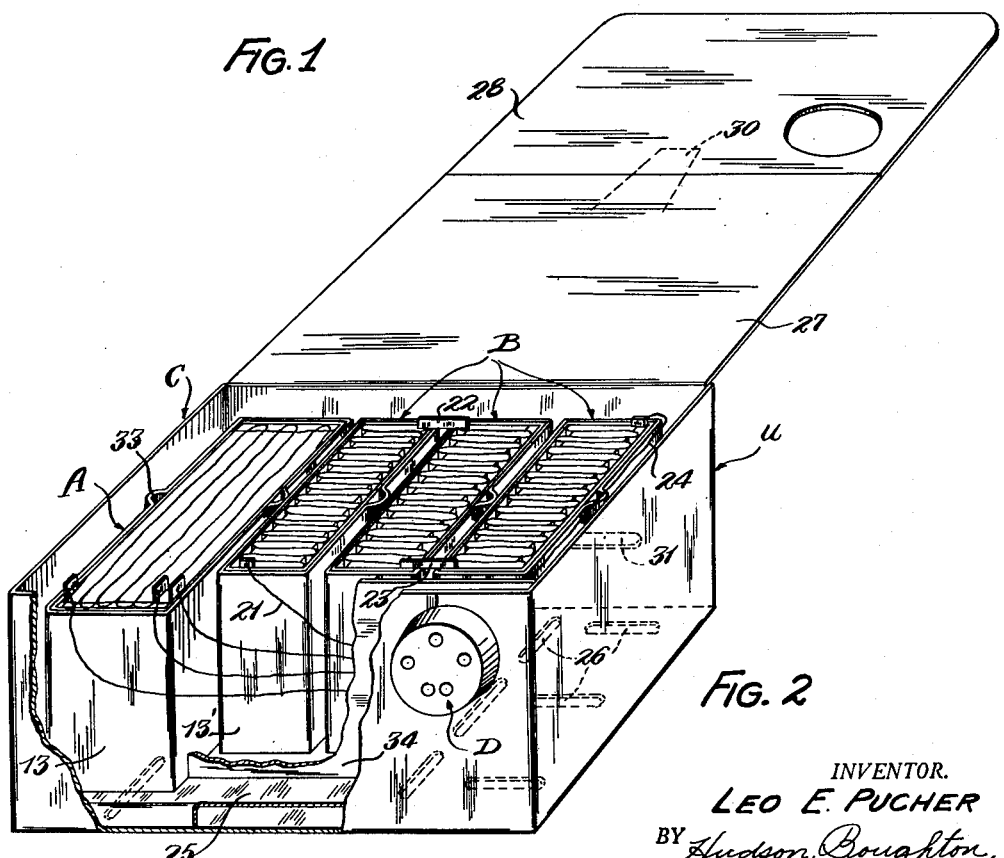
Fig. 2 is a perspective view of the assembly shown in Fig. 1, with the cover open and portions broken away to show the interior construction.

Referring to the drawings, the battery assembly shown in Figs. 1 and 2, and designated generally by the reference character U, is designed for use with radio-type, meteorological equipment and includes an "A" battery, designated generally by the reference character A, and a "B" battery consisting of three batteries each designated generally by the reference character B, and connected in series to give the desired voltage. In the embodiment shown, the voltage of the "A" battery is 6 volts with an end cell having a voltage of 1.5 volts, and that of the "B" battery 115 volts. The "A" and "B" batteries are enclosed within a casing, designated generally by the reference character C, and the connection to the equipment with which it is used made by a plug receptacle D accessible through one side of the casing C.

Referring particularly to Figs. 3, 4 and 5, the battery shown therein comprises a plurality of series-connected cells, each cell including a positive plate P and a negative plate N separated by a porous separator S. The adjacent plates of opposite polarity of adjoining cells are separated by a ribbon-like, flexible, electric insulating member 10 impervious to the action of the electrolyte. Any suitable material may be employed for the member 10 which is impervious to the electrolyte of the battery and a good electrical insulator, such as, a clear polyethylene film. The plates on opposite sides of the insulating member are in face-to-face or opposed position and are stapled together and to the insulating member 10 by staples 11. Other suitable means, such as a rivet or the like, may be employed for mechanically connecting the plates to the insulating member and electrically connecting the plates together, as desired.

After the plates are stapled to the insulating member, a suitable cement may be applied over the staples to close any possible openings therearound. The separators S are preferably cemented or otherwise fixed to either the positive or negative plates of each cell for ease of handling. The cement employed for sealing the staples can be used for this purpose. The adjacent plates on both sides of the insulating material 10 are of alternate polarity, with the result that when the ribbon-like insulating member is folded in accordion fashion, a positive and negative plate separated by a separator S is located between each fold of the member 10 and the cells thus formed are series-connected by the staples 11.

In the embodiment shown, the negative plates N are preferably formed of sheet magnesium about .016" thick; however, other forms of magnesium may be used, such as magnesium screen. The positive plates P shown are of the pasted grid type and comprise a cuprous chloride water paste upon a grid, preferably formed of copper screen wire. A small quantity of silver chloride is added to the cuprous chloride and water mixture or paste to produce the paste that is easy to handle and apply. Such a paste has a short setting time, produces a pasted grid having good mechanical strength, and increases the voltage and capacity of the cell. A small quantity of either or both ammonium chloride or potassium chloride is also added. The addition of ammonium chloride reduces the time required to activate the positive plate when it is desired to place the battery in service. The ammonium chloride and the potassium chloride increase the operating temperature range of the battery. The ammonium chloride adds heat to the electrochemical action and thus aids low temperature operation and the potassium chloride tends to restrict the effect of the heat which might otherwise destroy the cell when subjected to high temperatures. Both the potassium chloride and the ammonium chloride but, more particularly, the potassium chloride, also improve the conductivity of the cell and in this way increase or improve the operation of the battery at low temperature.

The specific amounts of silver chloride, ammonium chloride and/or potassium chloride used may vary according to the particular use for which the battery is designed and the hardness of the plates desired. If hard plates are not required, the silver chloride may be omitted entirely.

In making the paste, the cuprous chloride and silver chloride are preferably mixed together in dry powdered form. To this is added an ammonium chloride and/or potassium chloride solution to produce a mix having a consistency that can be conveniently pasted on a grid. The grid is preferably a copper screen of any appropriate size which will support the paste.

By way of example, a very satisfactory paste can be made by grinding together ninety-six grams of dry cuprous chloride and four grams of dry silver chloride until they are thoroughly mixed and then adding 12.75 cc. of water solution containing .1% by weight of ammonium chloride and a .4% by weight potassium chloride. This mix is then applied to a copper screen 40 x 40 mesh either by pasting or dipping and air-dried over night. The resulting plates are preferably approximately .025" to .035" thick and when assembled with negative magnesium plates of the character mentioned in the container and water added thereto produce a cell having a voltage of about 1.5 volts and a satisfactory temperature operating range from 140° F. to minus 58° F.

The staples 11 are preferably inserted through the negative plate first, in which event, the negative plate has small openings therein for the reception of the staples so that pieces of magnesium will not be carried through the insulating member 10 and into the positive plate P where their presence would be detrimental to the operation of the cell.

The insulating member 10 is preferably wider than the height of the plates and extends further below the lower edges of the plates than it does above their upper edges. This helps to prevent short circuiting of the cells, as will be hereinafter apparent. As previously stated, the insulating member 10 forms the cell dividers or parts thereof. The open sides of the cells are closed in order to provide separate cells for each pair of positive and negative plates in any suitable manner. As shown, this is accomplished by wrapping a suitable tape 12 around the bundle of plates. The tape not only closes the open sides of the folds but strengthens the assembly. The tape 12 can be an acetate waterproof tape having an adhesive thereon. If it is desired to have the bottom of the cells closed, they can be closed in a similar manner.

Figure 6:
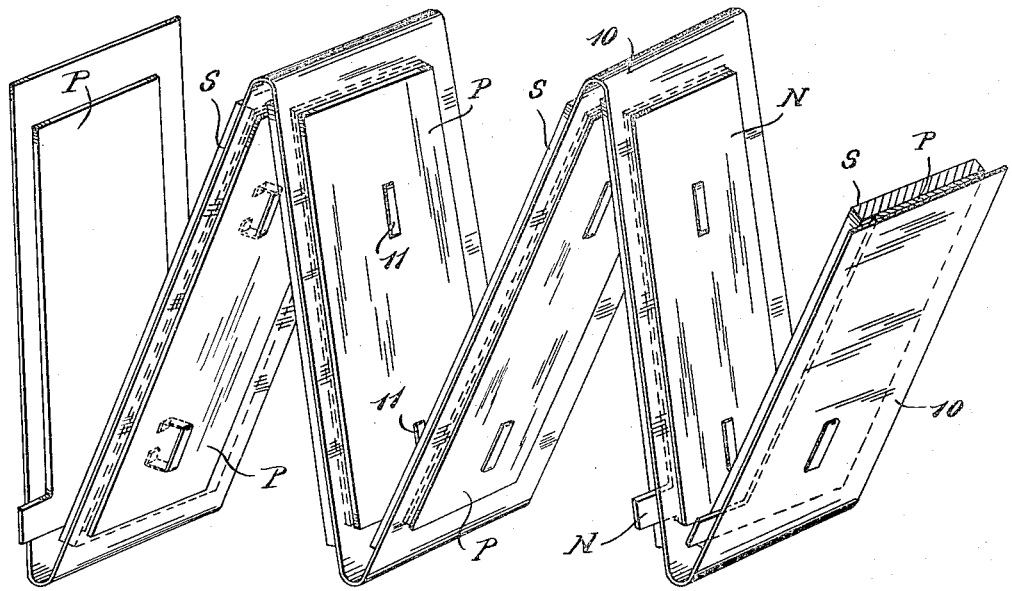
Fig. 6 is a fragmentary perspective view of the battery shown in Fig. 3 at one stage of its manufacture.
Figure 7:
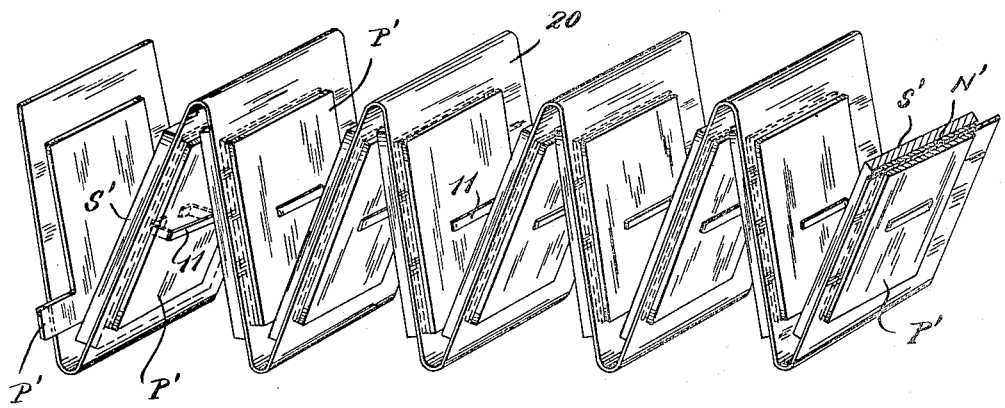
Fig. 7 is a fragmentary perspective view of the battery shown in Fig. 5 at one stage of its manufacture.

After the tape 12 is applied, the assembly is inserted in an open-ended collar 13 to more securely hold the parts in assembled position and the connections 14, 15, 16 to the end plates, which may have terminal lugs formed integral therewith made in a suitable manner. Because of the end cell incorporated in the battery A, two negative plates are positioned opposite each other adjacent to the right-hand end of the insulating material 11, as shown in Fig. 6. The separator S for the end cell is connected to the positive plate P; however, as previously stated, the separator may be connected to either plate as desired. Attention is also called to the fact that the end folds of the insulating material 11 have only one plate connected thereto, as would be expected, which plates form parts of the end cells of the battery.

The three batteries B which form the "B" battery are alike and are manufactured in the manner just described with respect to the battery A to which they are similar except for the number of cells and the size and shape of the plates. As shown, the negative and positive plates N', P', respectively, are narrower than those of the "A" battery and are connected together and to the insulating member 20 corresponding to the member 10 by one staple 11 instead of two. The other corresponding parts are designated by the same reference character with a prime mark affixed thereto.

The "A" battery A is arranged along one side of the casing C and the batteries B which constitute the "B" battery arranged in the casing along the "A" battery, with the desired connections 21, 22, 23, 24 made to the socket D. The casing C may be of any suitable design and formed of any satisfactory material. The casing is preferably formed of kraft paper having a paraffin coating to make it water or moisture-proof. The casing is generally box-like in shape and has a platform or false bottom 25 provided with perforations 26 therein, upon which platform the batteries rest, with the lower edges of the collars 13, 13' engaging the platform. Preferably, suitable supports 24, which may comprise strips of water-proofed kraft paper on edge, are provided intermediate the bottom of the casing and the platform for strengthening the platform. The casing C includes a hinged cover 27 having a flap 28 which is adapted to be inserted in the front of the casing to secure the cover in place. The cover is provided with a perforated portion 30 which may be readily partially removed to form an opening for adding water to the battery. The rear wall of the casing is provided with an elongated slot 31 placed a predetermined distance above the bottom of the casing for limiting the water level and furnishes a convenient outlet for draining excess water from the casing after the separators S, S' have been saturated. By placing the slot 31 in the end of the casing opposite that at which the water inlet is formed, the water will flow from one end of the casing to the other and wet every separator before it overflows. Notches 32 in the lower edge of the collar 13, 13' permit relatively free passage of water through the lower portions of the casing.

The batteries A, B are separated from one another and the side walls of the casing by bulges or beads 33 formed in the collars 13, 13'. The ends of the batteries are spaced from the ends of the casings by suitable members 34. The spacing referred to facilitates the passage of water throughout the cell structures and assures maximum efficiency by the battery.

The battery, which is unreactive in the dry state, may be stored in a dry condition and when wanted, activated by the mere addition of water through the perforated portion 30. The excess water can be drained off through the slot 31. During discharge, the plates expand causing electrolyte to be squeezed from the separators S. This electrolyte drips down and collects beneath the platform 25 where it may freeze if the ambient temperature is sufficiently low. This excess electrolyte being confined to the bottom of th casing and out of contact with the cells cannot adversely affect the operation of the battery. In this respect, attention is called to the fact that the lower ends of the separators S are a considerable distance above the platform 25.

Because of the hygroscopic nature of cuprous chloride, the battery unit shown should be sealed as by moisture-proof adhesive tape around the openings in the casing if it is to be stored for any length of time before being used. As an alternative arrangement, the battery unit may be enclosed in a moisture-proof bag or package, preferably containing a small quantity of moisture absorbing chemical, for example, silicon gel.

From the foregoing, it will be apparent that the objects of the invention heretofore enumerated and others have been accomplished and that there has been provided a novel and improved battery and method of making the same, which facilitates the manufacture of batteries of the character referred to. While the preferred embodiment of the invention has been described with considerable detail, it is to be understood that the invention is not limited to the particular battery or construction shown; for example, the insulating members separating adjacent plates of adjoining cells may be individual members instead of the ribbon-like, pleated members shown and the plates may be connected thereto and to each other in any suitable manner other than the manner shown. As previously stated, the cells may be of any suitable type; for example, lead-acid, in which event, the insulating member, staples, etc., will be formed of suitable material resistant to the electrolyte employed. It is my intention to be limited only by the scope of the appended claims.

Having thus described my invention, I claim:

1. A deferred action battery including a container having a movable cover, a partition in said container spaced above and generally parallel with the bottom thereof, said partition dividing said container into upper and lower compartments and having a plurality of openings, a plurality of relatively rigid open-ended collars in said upper compartment having their lower open ends resting upon said partition and in communication with said lower compartment through said openings in said partition, a multi-cell battery in each of said collars, the cells of said batteries comprising positive and negative electrodes separated by absorbent material and having their upper and lower ends open whereby the lower ends of a plurality of said cells are in communication with said lower compartment allowing electrolyte in said cells other than that absorbed in said absorbent material to drain into said lower compartment.

2. A deferred action battery including a container having a movable cover, a partition in said container spaced above and generally parallel with the bottom thereof, said partition dividing said container into upper and lower compartments and having a plurality of openings, a plurality of relatively rigid open-ended collars in said upper compartment having their lower open ends resting upon said partition and in communication with said lower compartment through said openings in said partition, a multi-cell battery in each of said collars and having its lower ends spaced slightly above the lower end of its respective collar, the cells of said batteries comprising positive and negative plate-like electrodes of substantially the same facial area separated by absorbent material, and having their upper and lower ends open and in communication with said lower compartment whereby electrolyte therein other than that absorbed in said absorbent material can drain into said lower compartment.

3. A deferred action battery including a container having a movable cover, a partition in said container spaced above and generally parallel with the bottom thereof, said partition dividing said container into upper and lower compartments and having a plurality of openings, a plurality of relatively rigid open-ended collars in said upper compartment having their lower open ends resting upon said partition and in communication with said lower compartment through said openings in said partition, a multi-cell battery in each of said collars and having its lower ends spaced slightly above the lower end of its respective collar, the cells of said batteries comprising positive and negative plate-like electrodes of substantially the same facial area separated by absorbent material, and liquid impervious members of approximately the same facial area as said electrodes interspersed to said batteries and connected along opposite edges forming cell compartments having their upper and lower ends open and in communication with said lower compartment whereby electrolyte therein other than that absorbed in said absorbent material can drain into said lower compartment.

LEO E. PUCHER.

References Cited in the file of this patent

UNITED STATES PATENTS

| Number | Name | Date |
|---|---|---|
| Re. 22,065 | Young | Apr. 7, 1942 |
| 229,122 | Hardy | June 22, 1880 |
| 300,666 | Vetter | June 17, 1884 |
| 1,509,209 | Huntley | Sept. 23, 1924 |
| 1,562,945 | Deibel | Nov. 24, 1925 |
| 1,610,261 | Cole | Dec. 14, 1926 |
| 1,633,224 | Ogden | June 21, 1927 |
| 1,640,039 | Keller | Aug. 23, 1927 |
| 1,863,794 | Huntley | June 21, 1932 |
| 2,066,010 | Lindem | Dec. 29, 1936 |
| 2,151,193 | Deibel | Mar. 21, 1939 |
| 2,209,185 | Bower | July 23, 1940 |
| 2,473,546 | Ruben | June 21, 1949 |
| 2,491,640 | Blake et al. | Dec. 20, 1949 |
| 2,502,723 | Harriss | Apr. 4, 1950 |
| 2,529,511 | Murphy | Nov. 14, 1950 |
| 2,543,106 | Harriss | Feb. 27, 1951 |
| 2,564,495 | Mullen | Aug. 14, 1951 |

FOREIGN PATENTS

| Number | Country | Date |
|---|---|---|
| 556,907 | Great Britain | Oct. 27, 1943 |